United States Patent

[11] 3,589,255

[72] Inventor Donald M. Harvey
 Rochester, N.Y.
[21] Appl. No. 767,102
[22] Filed Oct. 14, 1968
[45] Patented June 29, 1971
[73] Assignee Eastman Kodak Company
 Rochester, N.Y.

[54] INDICATOR FOR USE IN PHOTOGRAPHIC APPARATUS TO AUTOMATICALLY SENSE A FLASH LAMP
8 Claims, 11 Drawing Figs.

[52] U.S. Cl. .................................................. 95/11, 95/42
[51] Int. Cl. .................................................. G03b 19/00, G03b 17/18
[50] Field of Search ........................................ 95/11, 11.5, 11 L, 42; 431/92, 93

[56] References Cited
UNITED STATES PATENTS

| | | | |
|---|---|---|---|
| 2,024,225 | 12/1935 | Igari | 431/93 |
| 2,972,937 | 2/1961 | Suits | 95/11.5 |
| 2,625,863 | 1/1953 | Kirwin | 95/11.5 |
| 3,380,357 | 4/1968 | Harvey | 95/11.5 |
| 3,383,995 | 5/1968 | Bresson | 95/11.5 |
| 3,393,620 | 7/1968 | Reiche et al. | 95/11 |

Primary Examiner—Samuel S. Matthews
Assistant Examiner—Robert P. Greiner
Attorneys—Robert W. Hampton and John D. Husser ABSTRACT: Photographic apparatus, such as a still camera or flash holder, that accepts percussively fired flash lamps and has an indicator for determining whether the lamp in the firing position is good or has been used. The lamps may be incorporated in a multilamp unit, and a signal responsive to the indicator may be electrically or mechanically activated.

PATENTED JUN29 1971 3,589,255
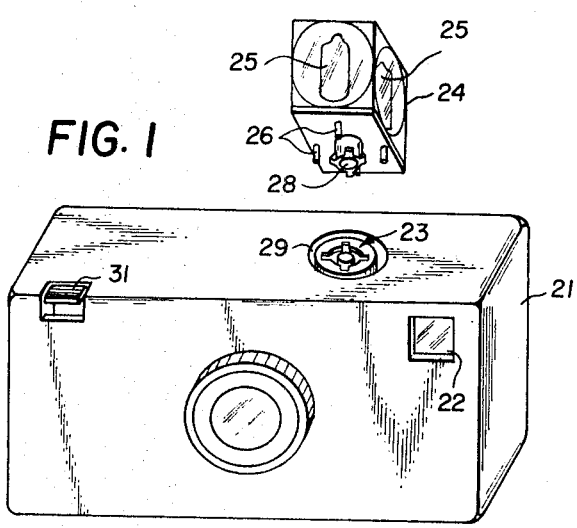
FIG. 1
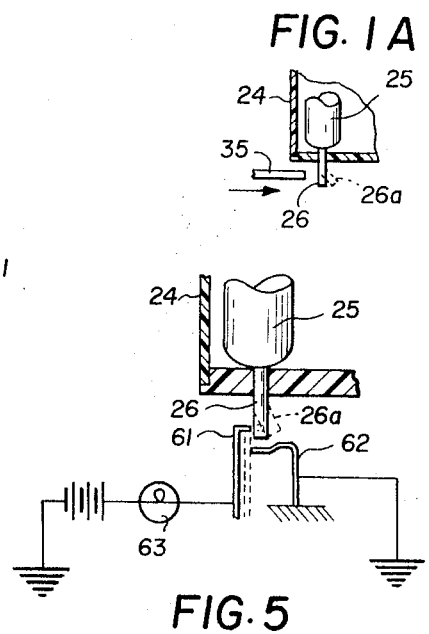
FIG. 1A
FIG. 5
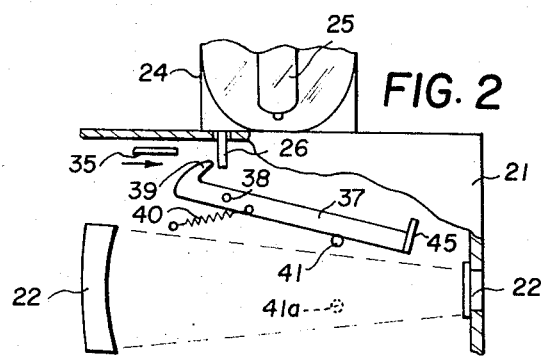
FIG. 2
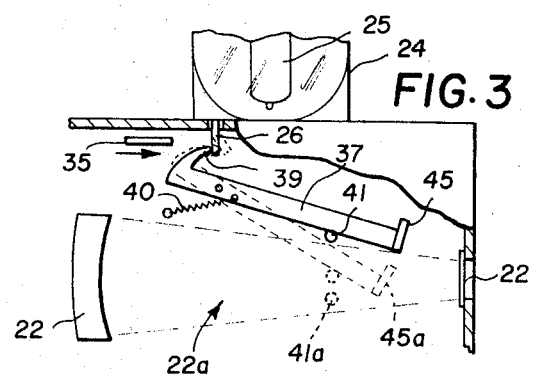
FIG. 3
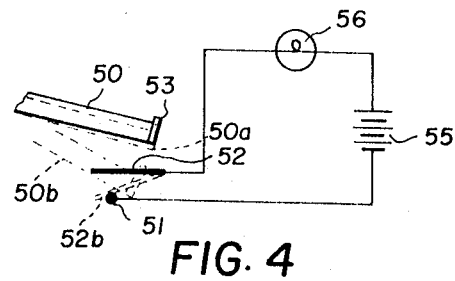
FIG. 4
DONALD M. HARVEY
INVENTOR.
BY John D. Hussen
Robert W. Hampton
ATTORNEYS

INDICATOR FOR USE IN PHOTOGRAPHIC APPARATUS TO AUTOMATICALLY SENSE A FLASH LAMP

CROSS-REFERENCE TO RELATED APPLICATIONS

Reference is made to the following commonly assigned copending U.S. Applications:

U.S. Application Ser. No. 765,930 entitled "Multilamp Flash Unit," filed Oct. , 1968, in the name of David E. Beach.

U.S. Application Ser. No. 766,739, entitled "Apparatus for Actuating Firing of Percussion-Ignitable Flash Lamps and Operating Mechanism Therefor," filed Oct. 11, 1968, in the name of William T. Hochreiter.

BACKGROUND OF THE INVENTION

1. Field of the Invention

This invention relates to flash photography and more particularly, to photographic apparatus such as still cameras or flash holders with photoflash systems to fire percussively ignitable flash lamps.

2. Description of the Prior Art

Various devices have been proposed for indicating the condition of an electrically ignited flash lamp received in the flash socket of a camera or separate flash holder. In these devices, circuit means are provided to complete electrically a signal circuit when the flash lamp in the circuit has a continuous ignition filament. Such devices are desirable because the condition of the lamp often is not evident to the operator.

Also, cameras employing rotatable flash units such as flashcubes are known, and a device, disclosed for example in U.S. Pat. No. 3,374,718, has been proposed to indicate electrically the condition of the electrically ignitable lamps in such flashcubes.

Recently, there has been developed a flash lamp that is percussively ignitable and may be incorporated in a disposable multilamp photoflash unit or package containing a plurality of such lamps. An example of percussively ignitable lamps and units is disclosed, for example, in copending U.S. application Ser. No 765,930, filed Oct. 8, 1968, "Multilamp Flash Unit" in the name of David E. Beach. That application describes a multiple lamp unit in which the percussion element of each lamp is exposed for striking by suitable means.

SUMMARY OF THE INVENTION

The present invention is an improvement in photographic apparatus, such as a still camera or flash holder, having means for accepting such percussively fired lamps. As such, the invention comprises means for indicating to the operator the condition of the flash lamps.

In a preferred form of the invention, a sensing member cooperates with the flash firing percussion element selectively to control signal means to indicate the lamp condition to the operator by sensing whether the percussion element of the lamp has been deformed.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which:

FIG. 1 is a perspective view of a photographic still camera embodying the present invention, together with a suitable flash unit containing a plurality of percussively fired lamps;

FIG. 1a is a view showing a portion of the base of a flash unit and the cooperating striker to fire the lamps;

FIG. 2 is a partial side view of a preferred embodiment of the present invention as incorporated in the camera of FIG. 1, showing the lamp sensing means together with associated camera elements;

FIG. 3 corresponds to FIG. 2 but shows the lamp sensing means in its sensing position;

FIG. 4 is a view of a second embodiment of the invention, showing electrical signal means to indicate the lamp condition; and FIG. 5 shows an embodiment with electrical signal means alternative to that shown in FIG. 4.

DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

With reference to FIG. 1, there is shown a photographic roll film still camera comprising a light tight camera body 21 having a picture-taking or lens axis on which are located the usual focusing lens and film plane for holding a frame of a roll of photosensitive film (not shown). The camera shutter mechanism and diaphragm are also positioned to be in operative relationship along the axis to expose a frame of film located at the film plane, and a viewfinder 22 is provided to show the scene to be recorded.

Accessibly located at the top wall of the camera body 21 is a multilamp package receiving socket 23 designed to receive a multilamp photoflash unit 24 containing a plurality (four) of percussively ignitable flash lamps 25. The lamps of package 24 and a suitable receiving socket are more fully described in the copending Beach application referred to above. Briefly, however, the photoflash lamps 25 are ordinately mounted in a vertical position about a vertical axis of rotation on a substantially square base. Depending from the base of each lamp 25 is an exposed element or tube 26 containing a percussively ignitable material that burns when the tube 26 is struck by a high energy percussion striker in the camera. Preferably the end of each percussion tube 26 suitably is free to be deformed, as shown at 26a in FIG. 1a, after engagement by the percussion striker. Individual light reflectors are positioned behind each lamp 25 and an overall light transmitting protective cover is provided. The package base defines the four lamp sides and includes a depending center connector post 28 that is received in an opening of socket 23 in any one of four predetermined positions in which one of the lamps 25 is in the operative or firing position. Percussion tube ends 26 are received in a continuous annular groove 29 for engagement with the camera striker when in the firing position.

The preferred embodiment of this invention, as shown in FIGS. 1 through 3, suitably may be incorporated in a camera having any known operating and flashcube indexing mechanism, such as that disclosed in U.S. Pat. No. 3, 353, 467. As described therein, roll film is wound along the film plane, for positioning successive frames of film on the film plane, by an accessible film winding lever. The lever also sets the camera shutter operating mechanism, which is released by an accessible body release member 31 when fully depressed to expose the positioned film frame for a predetermined time.

To provide for flash pictures, a lamp firing mechanism is built into the camera body. The firing mechanism comprises a striker member 35 which when released strikes the percussion tube 26 of a flash lamp 25 in the operative position. The striker member and the associated firing mechanism is more fully described in U.S. Application Ser. No. 766,739 "Apparatus for Actuating Firing of Percussion-Ignitable Flash Lamps and Operating Mechanism Therefor," filed Oct. 11, 1968, in the name of William T. Hochreiter.

For flash operation as described in the copending Hochreiter application, illumination is synchronized with film exposure by the release member 31. When the body release 31 is fully depressed, the striker member 35 strikes percussion tube 26 with a high energy impact to deform the tube and thereby fire the lamp in timed relation with camera operation.

In accordance with the present invention, there is provided a sensing lever 37 pivotable about an axis 38 and including a sensing pin 39 that selectively is moved toward the tube 26 of the lamp in firing position to sense the condition of the tube 26. Although a lamp 25 may be faulty for other reasons, the presence of a deformed tube is a good indication that the lamp will not fire.

Sensing lever 37 biased to rotate clockwise (FIGS. 2 and 3) by a spring 40 to the sensing position. However, sensing lever 37 normally is in the position as shown in FIG. 2 by an extension arm 41 of release member 31, but is moved to the sensing position to engage tube 26, as shown in FIG. 3, as release member 31 is depressed. When the camera is operated by depressing release member 31, arm 41 enables sensing lever 37 to assume its sensing position prior to member 31 reaching its fully depressed position, as illustrated by 41a, in which the shutter and lamp firing mechanisms are actuated.

Further in accordance with the invention, the sensing lever 37 is provided with a flag 45 that cooperates with the viewfinder 22 to indicate the lamp condition. Thus, when the sensing lever 37 is in the location sensing a tube 26 that has not been deformed, as shown in solid lines in FIG. 3, the flag 45 is out of the field of view 22a, designated by dashed lines, of viewfinder 22. However, when the tube 26 has been deformed, lever 37 is located as shown in dotted lines, in which flag 45 is visible in the viewfinder. The flag 45 suitably may contain a message such as "used lamp" or it may be specially coded to be readily noticed by the operator as the body release 31 is partially depressed.

To operate the photographic camera according to the preferred embodiment of the invention as shown in FIGS. 1 through 3, the connector post 28 of a multilamp flash unit 24 is placed in the socket 23 with a percussion flash lamp 25 in the operative position.

If the camera otherwise is ready for operation with augmenting flash, the operator aims the camera in the desired direction and depresses the body release member 31. This motion initially permits movement of the sensing lever 37 to its sensing position while member 31 is in a partially depressed position. The camera shutter and striker member 35 are actuated when release 31 is fully depressed.

If the lamp 25 in the firing position is goody, the sensing lever 37 assumes the solid line location shown in FIG. 3, and the signal flag 45 does not appear in the viewfinder. In that case, the operator continues to depress release 31 to its fully depressed position to operate the camera and fire the lamp. If, however, sensing lever 37 is moved to the location in which it senses a deformed tube 26, flag 45 appears in the viewfinder to warn the operator. The operator then may remove his finger from release 31 before the camera is operated and replace the lamp 25 by manually advancing the flash unit to move another lamp 25 into the flash operation position. After all four lamps in the inserted unit 24 have been sensed as having been used, the unit is removed or ejected in any known manner and another unit attached. Thus, it will be seen that an operator readily will know whether a fresh flash lamp 25 from the multilamp unit 24 is in operating position, and a flash picture will be taken when the operator knows in advance that the lamp probably is good.

In a second embodiment of the invention as shown in FIG. 4, a sensing lever 50 which operates in the same manner as lever 37 of the preferred embodiment controls an electrical switch in a sensing circuit containing an electrically actuated signal. The switch is composed of a fixed switch element 51 and a movable switch element 52 that is engageable with element 51. Element 52 cooperates with an end 53 on lever 50, which normally is in the solid line position. If the lever 50 moves to its sensing position and engages an undeformed tube end 26 in location 50a, the switch element 52 does not engage element 51. However, if lever 50 moves the additional amount to location 50b, in which it senses a deformed tube 26, end 53 causes the switch to close to complete an electrical signal circuit. The circuit suitably may include an electrical energy source 55 and an electrical signal lamp 56 visible in the viewfinder to indicate to the operator that a good lamp is not in the firing position.

The alternative embodiment of FIG. 5 shows an electrical circuit that is not responsive to the camera release. In this embodiment, the percussion tube directly is engageable by a resilient switch element 61 that is biased toward and engages a second switch element 62 only when the tube is deformed. In that case, the operator can see the lamp condition by a signal lamp 63 directly or through the viewfinder.

The invention has been described in detail with particular reference to a preferred embodiment thereof, but it will be understood that variations and modifications can be effected within the spirit and scope of the invention. For example, it is evident that the flag may be moved to a viewing position and the signal means energized when a good lamp rather than a used lamp is in the operative position. Alternatively, when the lamps are in a multilamp unit as in the preferred embodiment, separate sensing means for each lamp may be provided to sense all of the lamps of the unit at the same time, in which case the signal means visible to the operator can indicate which of the lamps are used.

I claim:

1. In photographic apparatus of the type having means for detachably receiving a flash unit having at least one flash lamp fireable by striking an impact receiving element which element is deformed after striking, the combination comprising:
    means for firing a lamp in such a unit received in said receiving means by striking said impact receiving element,
    means for sensing the deformation condition of said impact receiving element and for providing an output responsive thereto; and
    means for utilizing said output.

2. The combination according to Claim 1 wherein the sensing means comprises a sensing member movable from a normal position to a sensing position in which sensing position the member contacts the impact receiving element, the sensing member assuming a first location in the sensing position when a nondeformed element is contacted and a second location when a deformed element is contacted, and means responsive to the member in at least one of said locations for indicating the lamp condition.

3. The combination according to claim 2 wherein the apparatus has a viewfinder, and the utilizing means comprises signal means visible in the viewfinder when the sensing member is in the second location for indicating the lamp condition.

4. The combination according to claim 3 wherein the signal means comprises a flag operatively connected to the sensing member.

5. The combination according to claim 3 wherein the signal means comprises an electrical lamp, and the utilizing means further comprises an electrical circuit having a switch controlled by the location of the sensing member.

6. The combination according to claim 2 wherein the apparatus includes an exposure mechanism, and further comprising means biasing the sensing member toward the sensing position, the sensing member normally being held out of said sensing position by the exposure mechanism.

7. The combination according to claim 1 wherein the signal means comprises an electrical signal, and the sensing means comprises an electrical circuit including a switch responsive to the element condition.

8. The combination according to claim 7 wherein the switch comprises a switch element contacting the percussion element, the switch element closing the switch when the engaged percussion element is deformed.